(12) United States Patent
Kimura et al.

(10) Patent No.: US 11,333,596 B2
(45) Date of Patent: May 17, 2022

(54) OBSERVATION CONTAINER AND MICROPARTICLE MEASUREMENT DEVICE

(71) Applicant: Sumitomo Electric Industries, Ltd., Osaka (JP)

(72) Inventors: Akinori Kimura, Osaka (JP); Asako Motomura, Osaka (JP); Yoko Sugiyama, Osaka (JP); Hiroshi Suganuma, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 297 days.

(21) Appl. No.: 16/695,661

(22) Filed: Nov. 26, 2019

(65) Prior Publication Data
US 2020/0096435 A1    Mar. 26, 2020

Related U.S. Application Data

(63) Continuation of application No. PCT/JP2018/020257, filed on May 28, 2018.

(30) Foreign Application Priority Data

May 29, 2017 (JP) .............................. JP2017-105795

(51) Int. Cl.
  *G01N 15/14*  (2006.01)
  *G01N 21/01*  (2006.01)
  *G01N 21/64*  (2006.01)

(52) U.S. Cl.
  CPC ......... *G01N 15/1434* (2013.01); *G01N 21/01* (2013.01); *G01N 21/6458* (2013.01);
  (Continued)

(58) Field of Classification Search
  CPC .............. G01N 15/1434; G01N 21/01; G01N 21/6458; G01N 2015/1445;
  (Continued)

(56) References Cited

U.S. PATENT DOCUMENTS 6,211,953 B1 *  4/2001  Niino ..................... G01N 21/03
                                                        250/458.1
2017/0082531 A1  3/2017  Okada et al.
(Continued)

FOREIGN PATENT DOCUMENTS

EP   0950890 A2   10/1999
EP   2450690 A1   5/2012
(Continued)

OTHER PUBLICATIONS

EP2450690A! (Year: 2012).*

*Primary Examiner* — David P Porta
*Assistant Examiner* — Mamadou Faye
(74) *Attorney, Agent, or Firm* — Baker Botts, L.L.P.; Michael A. Sartori

(57) ABSTRACT

An observation container (10) includes: a bottom portion that includes a bottom wall (12A) (first plate part) and a bottom wall (12B) (second plate part) which intersect each other and that is configured to accommodate a liquid sample O as a sample containing microparticles to be imaged by imaging units (30A) and (30B) serving as an imaging device; and a region that has transparency with respect to a wavelength of light used for observation of the microparticles.

22 Claims, 11 Drawing Sheets

(52) U.S. Cl.
CPC ............... *G01N 2015/1445* (2013.01); *G01N 2015/1497* (2013.01); *G01N 2021/6497* (2013.01)

(58) Field of Classification Search
CPC ... G01N 2015/1497; G01N 2021/6497; G01N 15/1468; G01N 21/6456; G01N 21/0303; G01N 2021/0382; G01N 2021/6482; B01L 2200/0652; B01L 2300/0854; B01L 3/5082; G01B 11/24
See application file for complete search history.

(56) References Cited

U.S. PATENT DOCUMENTS

2017/0212052 A1    7/2017  Anazawa et al.
2018/0111126 A1*   4/2018  Osmus .............. B01L 3/502715

FOREIGN PATENT DOCUMENTS

| EP | 2450690 A1 * | 5/2012 | ............ G01N 21/03 |
|---|---|---|---|
| JP | H8-43400 A | 2/1996 | |
| JP | H10-253624 A | 9/1998 | |
| JP | H11-183358 A | 7/1999 | |
| JP | 2001-133397 A | 5/2001 | |
| JP | 2004-532405 A | 10/2004 | |
| JP | 2009-002674 A | 1/2009 | |
| JP | 2013-170861 A | 9/2013 | |
| JP | 2014-517263 A | 7/2014 | |
| JP | 2015-165249 A | 9/2015 | |
| JP | 2017-058352 A | 3/2017 | |
| WO | 2002/080090 A1 | 10/2002 | |
| WO | 2010/122346 A1 | 10/2010 | |
| WO | 2012/142496 A1 | 10/2012 | |
| WO | 2015/036589 A1 | 3/2015 | |
| WO | 2016/009796 A1 | 1/2016 | |

* cited by examiner

Fig.4
(A)
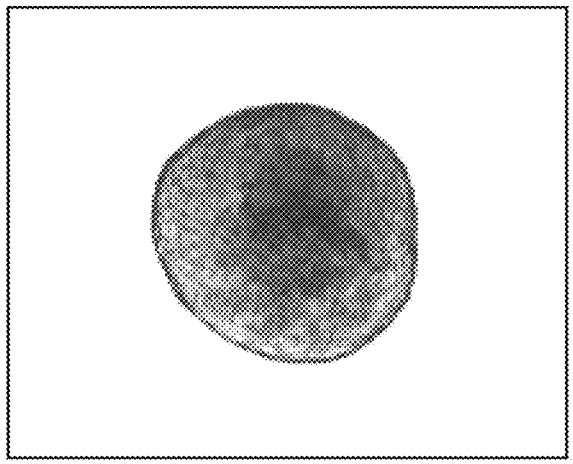
(B)
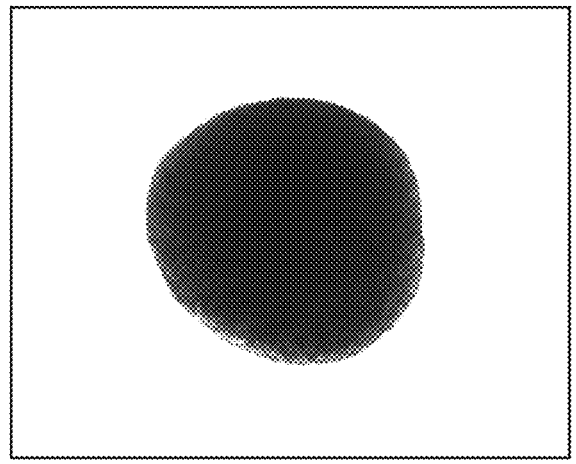

Fig.5
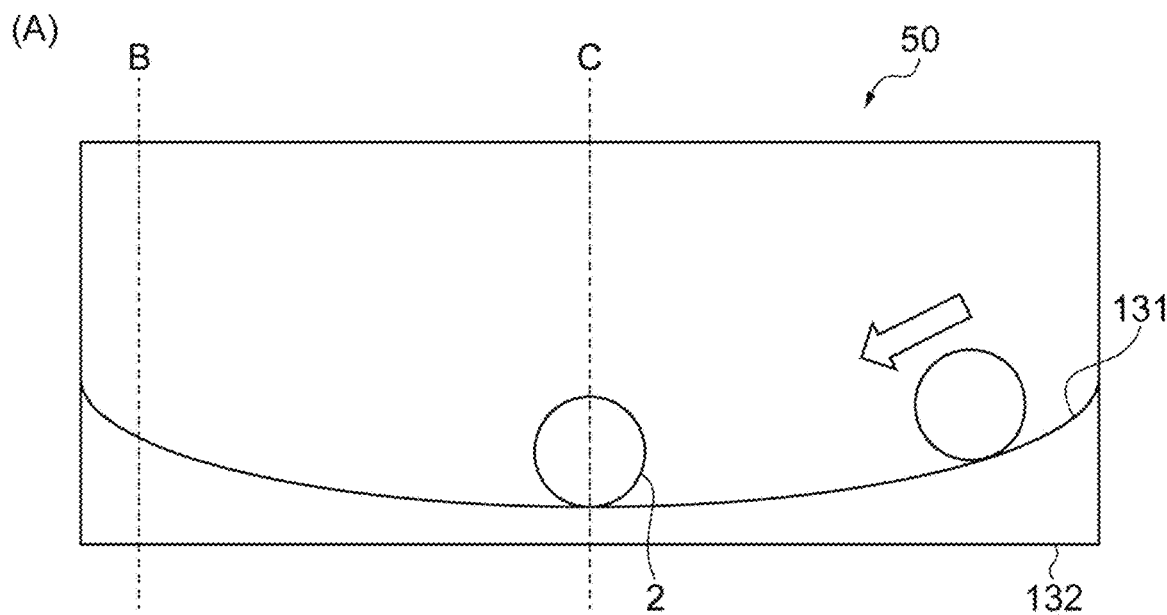
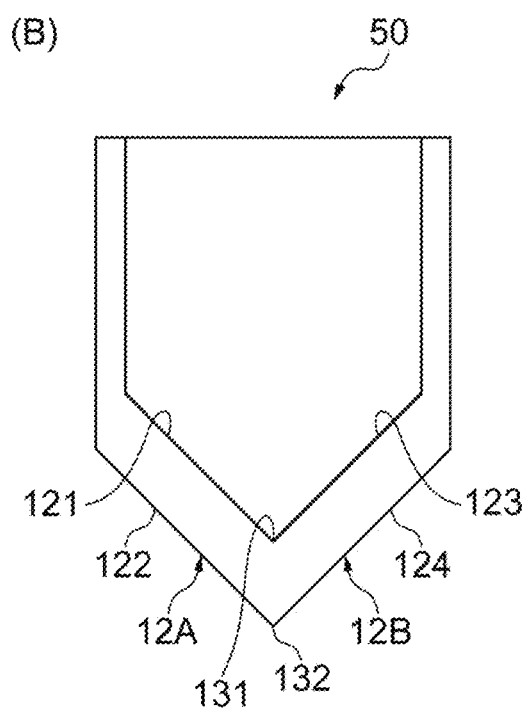 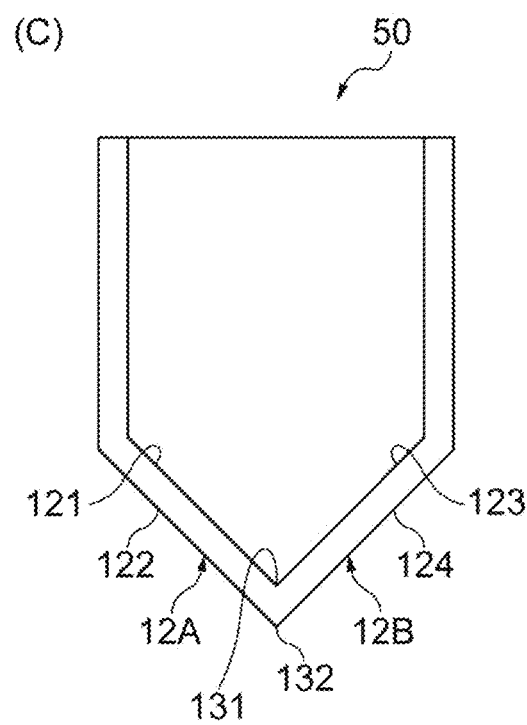

Fig.7
(A)
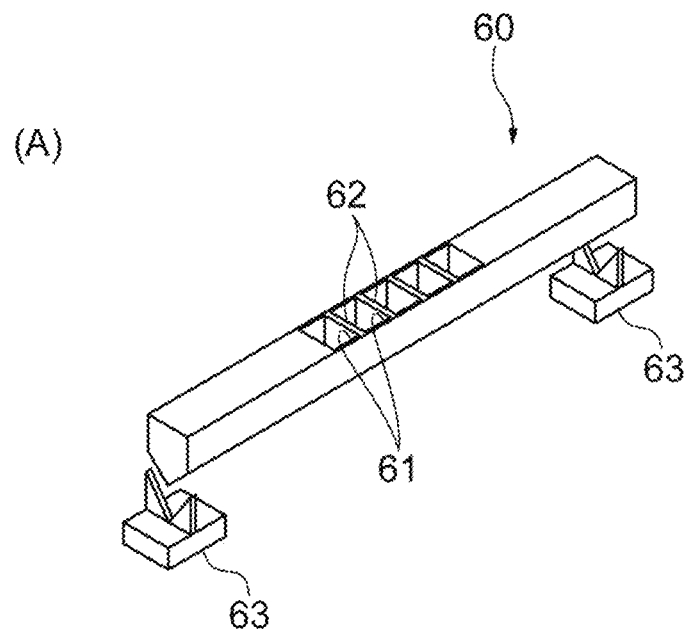
(B)
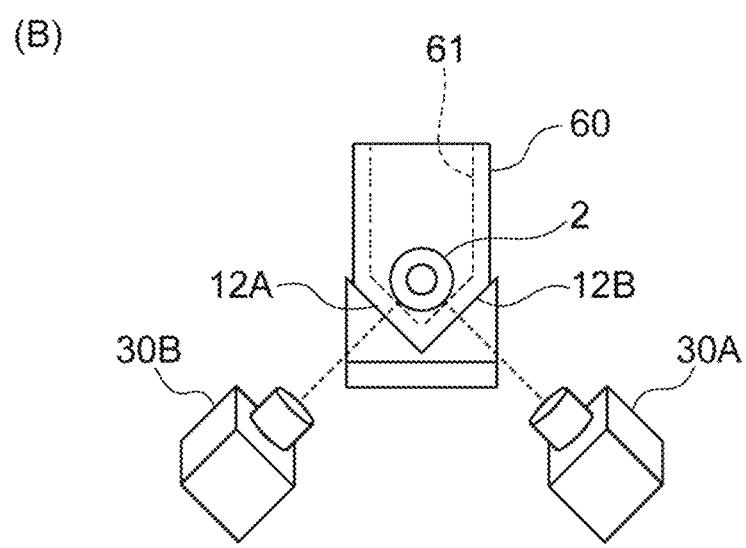

Fig.8
(A)
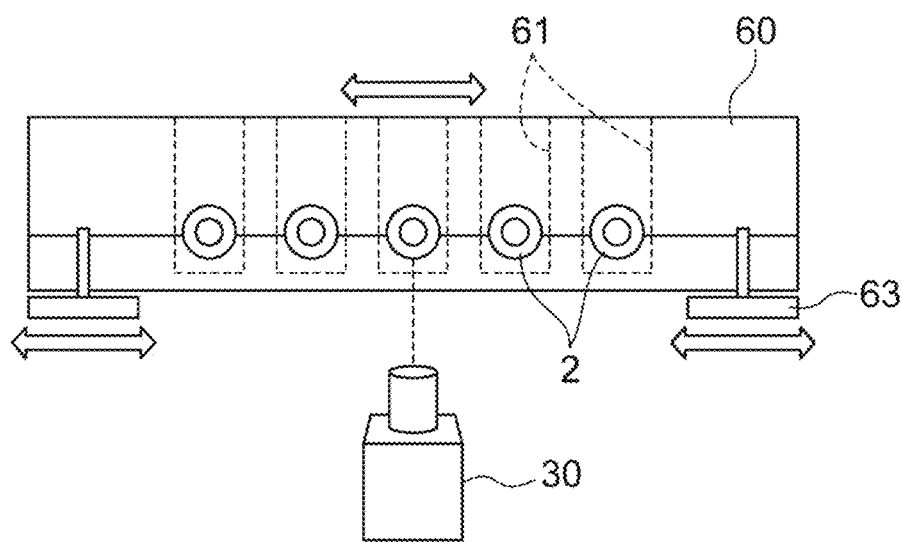
(B)
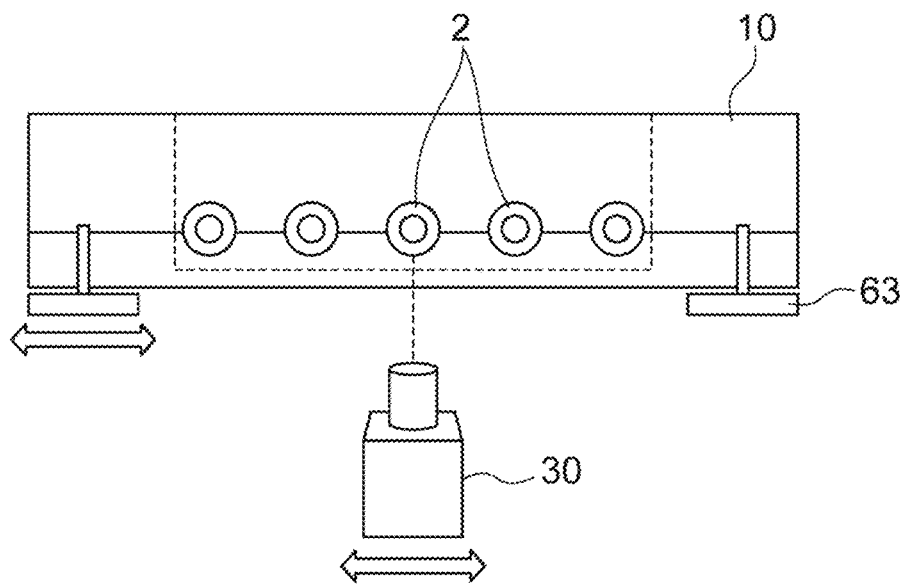

*Fig.10*
(A)
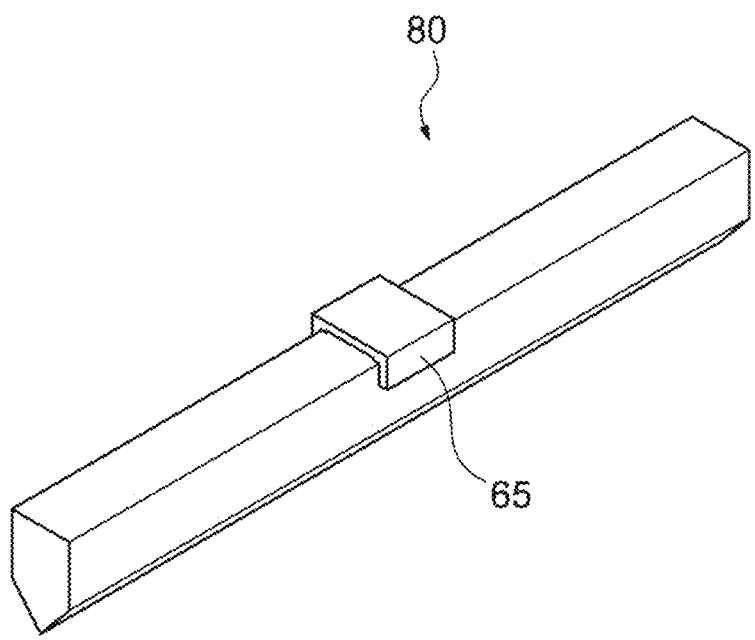
(B)
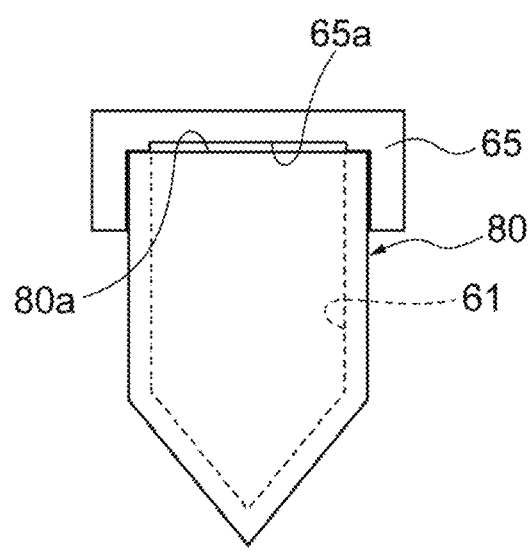

OBSERVATION CONTAINER AND MICROPARTICLE MEASUREMENT DEVICE

TECHNICAL FIELD

The present invention relates to an observation container and a microparticle measurement device.

BACKGROUND ART

Various methods for acquiring an image of a microparticle such as a cell and evaluating the three-dimensional shape of the microparticle have been studied (for example, Patent Literatures 1 and 2).

CITATION LIST

Patent Literature

Patent Literature 1: Japanese Unexamined Patent Publication No. 2014-517263
Patent Literature 2: Japanese Unexamined Patent Publication No. 2004-532405

SUMMARY OF INVENTION

Technical Problem

However, in a case where performing imaging related to microparticles, in some cases, light is refracted due to the three-dimensional shape of an observation container, and thus, an image having a distorted shape is captured. In this case, it is difficult to calculate the three-dimensional shape of the microparticle with high accuracy.

The present invention has been made in view of the above problem, and an object of the present invention is to provide an observation container capable of imaging a three-dimensional shape of a microparticle with higher accuracy and a microparticle measurement device including the observation container.

Solution to Problem (1) According to an aspect of the invention of the present application, there is provided an observation container including
  a bottom portion that includes a first plate part and a second plate part which intersect each other and that is configured to accommodate a sample containing microparticles to be imaged by an imaging device,
  in which the first plate part has a first inner surface and a first outer surface that are flat surfaces parallel to each other,
  in which the second plate part has a second inner surface and a second outer surface that are flat surfaces parallel to each other, and
  in which a region having transparency with respect to a wavelength of light used for observation of the microparticles is provided in both the first plate part and the second plate part.

(2) According to another aspect of the present invention, there is provided an observation container including
  a bottom portion that includes a first plate part and a second plate part which intersect each other and that is configured to accommodate a sample containing microparticles to be imaged by an imaging device,
  in which the first plate part has a first inner surface and a first outer surface configured with a flat surface,
  in which the second plate part has a second inner surface and a second outer surface configured with a flat surface,
  in which a line of intersection of the first outer surface and the second outer surface extends in a shape of a straight line,
  in which, in a cross section perpendicular to the line of intersection of the first outer surface and the second outer surface, the first inner surface and the first outer surface are parallel to each other, and the second inner surface and the second outer surface are parallel to each other,
  in which a thickness of the first plate part and a thickness of the second plate part change along the line of intersection of the first outer surface and the second outer surface, respectively,
  in which the line of intersection of the first inner surface and the second inner surface is close to the line of intersection of the first outer surface and the second outer surface at the central portion of the bottom portion, and the radius of curvature is 1 mm to 10 mm, and
  in which a region having transparency with respect to a wavelength of light used for observation of the microparticles is provided in both the first plate part and the second plate part.

Advantageous Effects of Invention

According to the present invention, an observation container capable of imaging a three-dimensional shape of a microparticle with higher accuracy and a microparticle measurement device including the observation container are provided.

BRIEF DESCRIPTION OF DRAWINGS

FIG. 4 is a diagram illustrating measurement results using near-infrared light and visible light.

FIG. 5 is a diagram illustrating a modified example of the observation container.

FIG. 7 is a diagram illustrating a modified example of the observation container.

FIG. 8 is a diagram illustrating a modified example of the observation container and the microparticle measurement device.

FIG. 10 is a diagram illustrating a modified example of the observation container.

DESCRIPTION OF EMBODIMENTS

Figure 1:
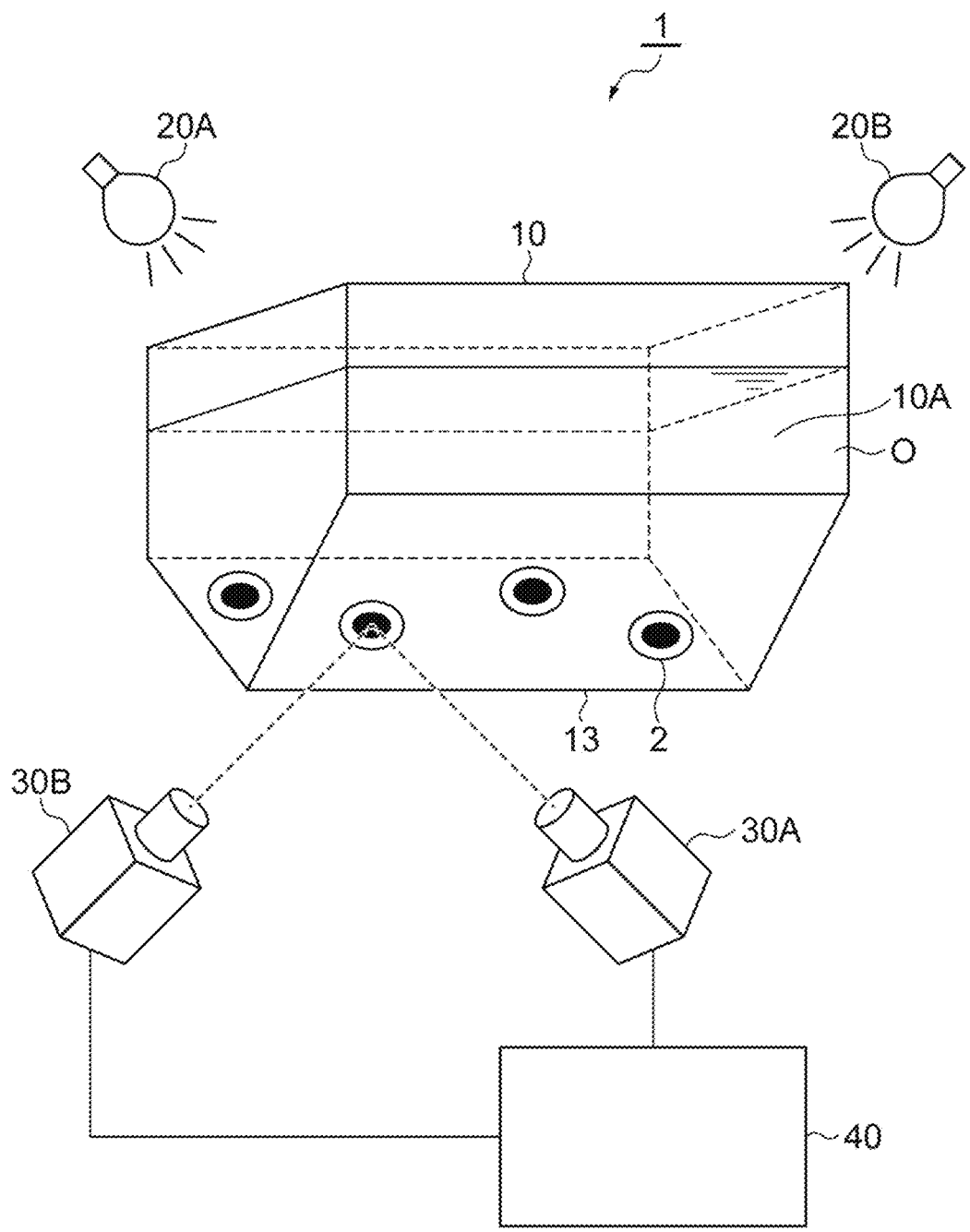
FIG. 1 is a schematic configuration diagram of a microparticle measurement device.

[Description of Embodiments of Invention of Present Application]

First, embodiments of the invention of the present application will be listed and described.

An observation container according to a first embodiment of the present application includes a bottom portion that includes a first plate part and a second plate part which intersect each other and that is configured to accommodate a sample containing microparticles to be imaged by an imaging device, in which the first plate part has a first inner surface and a first outer surface that are flat surfaces parallel to each other, in which the second plate part has a second inner surface and a second outer surface that are flat surfaces parallel to each other, and in which a region having transparency with respect to a wavelength of light used for observation of the microparticles is provided in both the first plate part and the second plate part.

According to the observation container, it is possible to image the microparticles staying in the bottom of the container by the imaging device from the outside of the first plate part and the second plate part at the bottom portion configured with the first plate part and the second plate part that intersect each other. Therefore, it is possible to image the shape of the microparticles from a plurality of directions with high accuracy.

In addition, the first plate part and the second plate part may be configured to be arranged so as to be perpendicular to each other. In this manner, in a case where the first plate part and the second plate part are arranged so as to be perpendicular to each other, it is possible to appropriately capture the image for grasping the three-dimensional shape of the microparticles.

In addition, an observation container according to a second embodiment of the present application includes a bottom portion that includes a first plate part and a second plate part which intersect each other and that is configured to accommodate a sample containing microparticles to be imaged by an imaging device, in which the first plate part has a first inner surface and a first outer surface configured with a flat surface, in which the second plate part has a second inner surface and a second outer surface configured with a flat surface, in which a line of intersection of the first outer surface and the second outer surface extends in a shape of a straight line, in which, in a cross section perpendicular to the line of intersection of the first outer surface and the second outer surface, the first inner surface and the first outer surface are parallel to each other, and the second inner surface and the second outer surface are parallel to each other, in which a thickness of the first plate part and a thickness of the second plate part change along the line of intersection of the first outer surface and the second outer surface, respectively, in which the line of intersection of the first inner surface and the second inner surface is close to the line of intersection of the first outer surface and the second outer surface at the central portion, and the radius of curvature is 1 mm to 10 mm, and in which a region having transparency with respect to a wavelength of light used for observation of the microparticles is provided in both the first plate part and the second plate part.

According to the observation container, it is possible to image the microparticles staying in the bottom of the container by the imaging device from the outside of the first plate part and the second plate part at the bottom portion configured with the first plate part and the second plate part intersecting each other. Therefore, it is possible to image the shape of the microparticles from a plurality of directions with high accuracy. Furthermore, according to the observation container, the line of intersection of the first inner surface and the second inner surface is close to the line of intersection of the first outer surface and the second outer surface at the central portion, and the radius of curvature is 1 mm to 10 mm. With such a configuration, the microparticles tend to stay in the vicinity of the central portion of the line of intersection of the first inner surface and the second inner surface, and thus, it is possible to more easily perform imaging the microparticles.

The region having transparency may be configured to transmit light having a wavelength band of 350 nm to 2000 nm. As described above, when the region having transparency is configured to transmit light having a wavelength band of 350 nm to 2000 nm, it is possible to perform the imaging by using the light in the wavelength band. Since the light in the above-mentioned wavelength band is appropriate for more detailed analysis of the internal structure and the like of the microparticles, it is possible to use the observation container for more detailed analysis of the microparticles.

A microparticle measurement device of the present application includes the observation container, a light source unit that is configured to irradiate the sample with measurement light, and a plurality of imaging units that are configured to capture transmission images of the microparticles generated by the measurement light irradiated from the light source unit on an outside of each of the first plate part and the second plate part of the observation container, in which a region which is on the optical path of the light received by the imaging unit in the observation container has transparency with respect to a wavelength of the light used for observation of the microparticles.

According to the above-described microparticle measurement device, it is possible to image the microparticles staying in the bottom of the observation container by the imaging device from the outside of the first plate part and the second plate part at the bottom portion configured with the first plate part and the second plate part intersecting each other. Therefore, it is possible to image the shape of the microparticles from a plurality of directions with high accuracy.

In addition, the imaging unit can be configured in a mode to be provided in the position where the optical axis of the light to receive is perpendicular to the first plate part or the second plate part provided in front of the imaging unit. By providing the imaging unit at the position perpendicular to the first plate part or the second plate part, it is possible to prevent the imaging unit from receiving the reflected light, the refracted light, or the like at the first plate part or the second plate part.

In addition, the light irradiated from the light source unit may be configured to include a portion of a wavelength band of 350 nm to 2000 nm. When the light in a wavelength band of 350 nm to 2000 nm is configured to be transmitted, it is possible to perform imaging by using the light in the wavelength band. Since the light in the above-mentioned wavelength band is appropriate for more detailed analysis of the internal structure and the like of the microparticles, it is possible to use the observation container for more detailed analysis of the microparticles.

In addition, a plurality of the light source units may be configured to be provided at positions facing the plurality of imaging units with the microparticles interposed therebetween. In a case where a plurality of light source units are provided at positions facing a plurality of imaging units with the microparticles interposed therebetween, since the imaging unit can receive light that transmits the microparticles with a large light quantity, it is possible to capture the transmission image of the microparticle with higher accuracy.

In addition, the imaging unit may be configured to image fluorescence emitted by the microparticle with respect to the measurement light irradiated from the light source unit. With such a configuration, the fluorescence emitted by the microparticles can be imaged by the imaging unit, and thus it is possible to acquire detailed information on the microparticles.

[Details of Embodiments of Invention of Present Application]

Specific examples of an observation container and a microparticle measurement device according to the present invention will be described below with reference to the drawings. Incidentally, the present invention is not limited to these examples, is disclosed by the claims, and is intended to include all the changes within the meaning and range equivalent to the claims.

Figure 2:
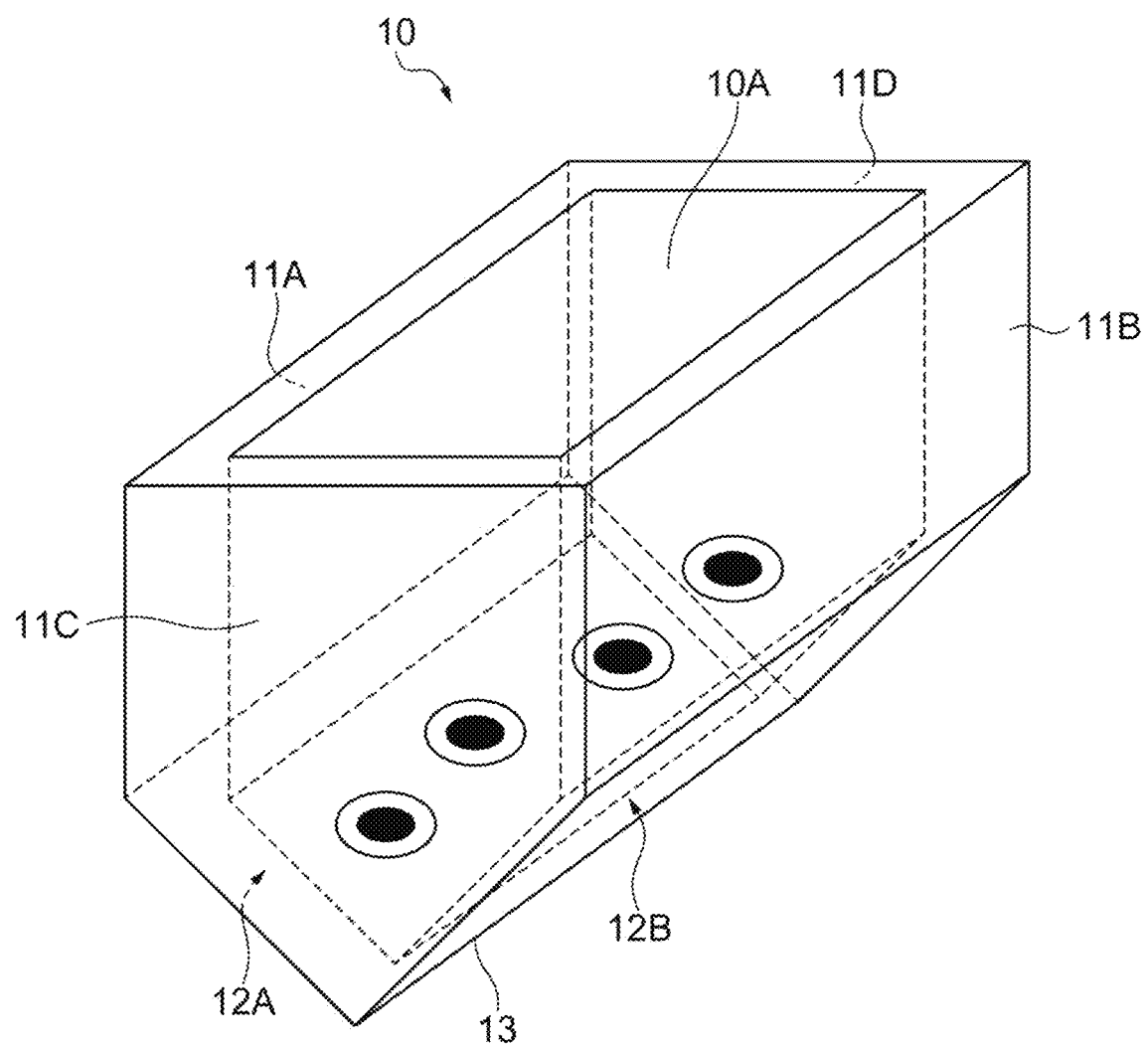
FIG. 2 is a schematic configuration diagram of an observation container.
Figure 3:
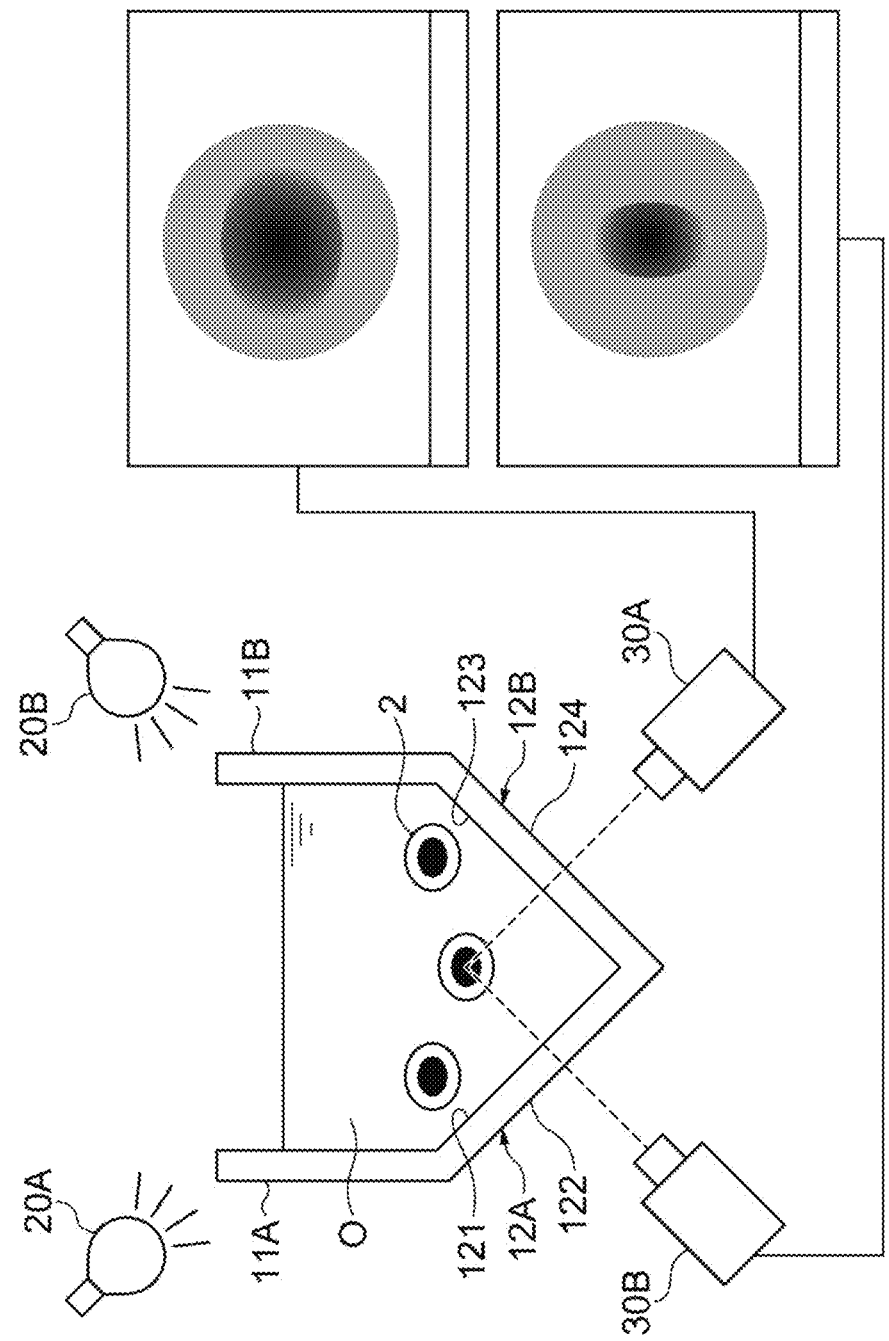
FIG. 3 is a diagram describing the microparticle measurement device.

FIG. 1 is a schematic configuration diagram of a microparticle measurement device according to an embodiment of the present invention. In addition, FIG. 2 is a schematic configuration diagram of an observation container, and FIG. 3 is a diagram describing the microparticle measurement device. As illustrated in FIGS. 1 and 3 and the like, a microparticle measurement device 1 is a device that performs measurement related to microparticles dispersed in a sample. The microparticles and the target in which the microparticles are dispersed are not particularly limited, but for example, a liquid may be employed. As an example in which microparticles are dispersed in a liquid sample, there may be exemplified cases where the microparticles may be cells, an aggregate of cells, fertilized eggs, or the like, and the liquid in which microparticles are dispersed may be a cell culture medium, physiological saline solution, or the like as an aqueous solution or water that can be adapted to the microparticles such as cells, an aggregate of cells, or fertilized eggs. Incidentally, in the embodiment, an example in which the sample is a liquid sample and the microparticles are dispersed in the liquid will be described. However, the sample only needs to contain the microparticles to be imaged, but the sample is not limited to the structure dispersed in a liquid.

As illustrated in FIG. 1, in the microparticle measurement device 1, a liquid sample O containing microparticles that are target objects 2 is accommodated in an observation container 10 for measurement, and transmitted light obtained by irradiating the target object 2 in the observation container 10 with measurement light is detected to capture a transmission image. And then, measurement, analysis, and the like related to the target object 2 are performed on the basis of the transmission image. For this reason, the microparticle measurement device 1 includes the observation container 10, light source units 20A and 20B, imaging units 30A and 30B (imaging devices), and an analysis unit 40.

The observation container 10 is a container in which the liquid sample O containing microparticles is accommodated when measurement related to the microparticles is performed. A region in which the liquid sample O is accommodated is referred to as an accommodation portion 10A. As illustrated in FIG. 2, the observation container 10 has a pair of side walls 11A and 11B having a rectangular shape in a plan view and facing each other on the long side, a pair of side walls 11C and 11D facing each other on the short side, and bottom walls 12A (first plate part) and 12B (second plate part) forming the bottom portion of the observation container 10.

As illustrated in FIGS. 1 and 2 and the like, the bottom walls 12A and 12B are configured with two plate-like members that intersect each other, and the intersecting position is the lowermost portion of the bottom portion. In addition, as illustrated in FIG. 3, the bottom wall 12A is configured with an inner surface 121 (first inner surface) and an outer surface 122 (first outer surface). The bottom wall 12A is a flat plate, and the inner surface 121 and the outer surface 122 are parallel to each other. The bottom wall 12B is configured with an inner surface 123 (second inner surface) and an outer surface 124 (second outer surface). The bottom wall 12B is a flat plate, and the inner surface 123 and the outer surface 124 are parallel to each other. The position where the depth as the container is maximum becomes a boundary portion 13 that is the boundary between the bottom walls 12A and 12B. More specifically, the line of intersection of the inner surface 121 of the bottom wall 12A and the inner surface 123 of the bottom wall 12B becomes the lowest portion in the bottom portion. In the case of the observation container 10, the boundary portion 13 of the bottom walls 12A and 12B extend along the long side (the extending direction of the bottom walls 12A and 12B) of the observation container 10.

In this manner, the accommodation portion 10A (the space accommodating the liquid sample O containing microparticles to be the target object 2) of the observation container 10 is a pentagon when viewed from the cross section (refer to FIG. 3) perpendicular to the longitudinal direction. Specifically, a pentagonal cross section is formed by the two bottom walls 12A and 12B, the pair of side walls 11A and 11B, and the line (corresponding to the upper end of the accommodation portion) connecting the other ends of the side walls 11A and 11B opposite to one end on the bottom walls 12A and 12B side.

The angle formed by the bottom walls 12A and 12B is not particularly limited, but is preferably 90° or about ±30° thereof. By setting the angle formed by the bottom walls 12A and 12B to be in the above-mentioned range, an image for three-dimensionally grasping the shape of the microparticles that are the target object 2 can be appropriately obtained by the imaging units 30A and 30B. In particular, when the bottom walls 12A and 12B are arranged so as to be perpendicular to each other, the shape of the microparticles that are the target object 2 can be appropriately imaged by the imaging units 30A and 30B.

The size of the observation container 10 is not particularly limited, but is appropriately set according to the arrangement of the light source units 20A and 20B and the imaging units 30A and 30B, the size of the microparticles that are the target object 2, and the like.

The material of the observation container 10 is not specifically limited, and for example, a glass, a PC resin, a PS resin, or the like may be used. A region through which at least light incident on the imaging units 30A and 30B passes in the observation container 10, that is, a region arranged in the imaging region by the imaging units 30A and 30B in the observation container 10 needs to have transparency with respect to the measurement light. In addition, in the observation container 10, the region that is arranged in the imaging region by the imaging units 30A and 30B has uniform thickness (wall thickness) of the observation container 10, that is, the pair of main surfaces are parallel to each other. In a case where the thickness of the observation container 10 is not uniform, the light from the imaging region is refracted and is incident on the imaging units 30A and 30B, and thus, the image of the target object 2 of which shape is distorted in the imaging units 30A and 30B may be acquired. By allowing the thickness of the region of the observation container 10 to be uniform, the transmission images in which measurement light or transmitted light is prevented from being affected by distortion or the like when passing through the observation container 10 can be captured by the imaging units 30A and 30B.

In a case where the deepest portion is formed in the bottom portion of the observation container 10 by the boundary portion 13 of the bottom walls 12A and 12B, the microparticles in the liquid sample O tend to move to the deepest portion in the bottom portion. Therefore, if the imaging units 30A and 30B are configured to image the deepest portion and the vicinity thereof, it is easy to image the microparticles.

Each of the light source units 20A and 20B is configured to irradiate a predetermined region of the observation container 10, particularly, the vicinity of the deepest portion with the measurement light. As the light source of the light source units 20A and 20B, a halogen lamp, an LED, or the like can be used. In addition, the light source units 20A and 20B may have a function of modulating the intensity.

As illustrated in FIG. 1, it is preferable that a plurality of light source units 20A and 20B are provided and the observation container 10 is irradiated from different angles corresponding to the imaging units 30A and 30B. With such an arrangement, the measurement by the imaging units 30A and 30B can be performed with higher accuracy.

Incidentally, in the embodiment, as the measurement light irradiated by the light source units 20A and 20B, near-infrared light is preferably used. Near-infrared light is light having a wavelength band of 630 nm to 2000 nm. Light in a portion of the above-mentioned wavelength range can be used as the measurement light. Incidentally, in addition to the near-infrared light, visible light can also be used as the measurement light. Visible light is light having a wavelength band of 400 nm to 630 nm. In addition, a combination of the near-infrared light and the visible light may be used as the measurement light. In addition, the measurement light may be only the visible light.

The imaging units 30A and 30B have a function of receiving the light obtained by allowing the measurement light irradiated from the light source units 20A and 20B to transmit through the target object 2 and detecting the intensity thereof. That is, the imaging units 30A and 30B are provided at positions facing the light source units 20A and 20B with the observation container 10 interposed therebetween. Each of the imaging units 30A and 30B has a detector in which a plurality of pixels are two-dimensionally arranged and convert light received by the pixels into intensity information. The detection results from the imaging units 30A and 30B are sent to the analysis unit 40.

As illustrated in FIG. 3, the imaging unit 30A is preferably arranged at a position where the optical axis of light incident on the imaging unit 30A is perpendicular to the bottom wall 12B. Further, the imaging unit 30A receive the light obtained when the measurement light from the light source unit 20A arranged at the side wall 11A side transmits through the target object 2. In addition, the imaging unit 30B is preferably arranged at a position where the optical axis of light incident on the imaging unit 30B is perpendicular to the bottom wall 12A. Further, the imaging unit 30B receives the light obtained when the measurement light from the light source unit 20B arranged at the side wall 11B side transmits through the target object 2. In a case where the imaging units 30A and 30B are arranged at positions where the optical axes of the light incident on the imaging units 30A and 30B are perpendicular to the bottom wall, the imaging units 30A and 30B can be prevented from receiving the reflected light, the refracted light, or the like on the bottom wall.

The imaging units 30A and 30B are preferably configured to simultaneously image the same imaging target. With such a configuration, the one imaging target (target object 2) in the observation container 10 can be grasped from different directions. It is considered that the target object 2 rotates as the liquid sample O moves. Therefore, the imaging units 30A and 30B can acquire more detailed information on the target object 2 by implementing a configuration for imaging a specific position of the observation container 10.

The imaging units 30A and 30B may have a configuration of detecting only the intensity of light having a specific wavelength that can distinguish, for example, the target object 2 from other components. In addition, the imaging units 30A and 30B may have a configuration of detecting a spectroscopic spectrum including intensity values for a plurality of wavelengths. A spectroscopic spectrum is a series of data obtained by extracting intensity values at arbitrary wavelengths from spectroscopic information and pairing the intensity values with corresponding wavelengths.

As a detector of the imaging units 30A and 30B, for example, a CMOS, CCD, InGaAs detector, an MCT detector configured with mercury, cadmium, and tellurium, or the like can be used. In addition, in a case where the imaging units 30A and 30B have a configuration of detecting a spectroscopic spectrum, the imaging units 30A and 30B further include a spectroscope having a function of spectroscopically splitting the incident light by wavelength in front of the detector. As the spectroscope, for example, a wavelength selection filter, an interference optical system, a diffraction grating, or a prism can be used.

In addition, the imaging units 30A and 30B may be hyperspectral sensors that acquire hyperspectral images. A hyperspectral image is an image in which one pixel is configured with N pieces of wavelength data and includes spectroscopic information including reflection intensity data corresponding to a plurality of wavelengths for each pixel. That is, the hyperspectral image is a three-dimensional configuration data that combines two-dimensional elements as an image and elements as a spectral data from the characteristics that each pixel constituting the image has intensity data of a plurality of wavelengths. Incidentally, in the embodiment, the hyperspectral image refers to an image configured with pixels having intensity data in at least four wavelength bands per pixel.

Incidentally, in the above description, the imaging units 30A and 30B have been described with respect to a case where the spectroscopic spectrum is acquired after the transmitted light from the target object 2 is spectroscopically split. However, the configuration in a case where the imaging units 30A and 30B acquire the spectroscopic spectrum is not limited to the above-described configuration. For example, the wavelength of light emitted from the light source units 20A and 20B may be variable.

The imaging units 30A and 30B preferably include a position adjustment mechanism that can adjust the distance from the bottom walls 12B and 12A of the observation container 10. The position adjustment mechanism can be realized by providing means for moving the imaging units 30A and 30B, for example, along a rail, but the specific configuration is not particularly limited. By providing the position adjustment mechanism for changing the distance between the imaging units 30A and 30B and the observation container 10, imaging can be performed in a state where the observation container 10 (the target object 2 inside the observation container) is arranged at a position different from the focal position of the imaging units 30A and 30B. In this manner, by imaging the observation container 10 arranged at the position different from the focal position by the imaging units 30A and 30B, an image including information different from the result obtained by imaging the target object arranged at the focal position in the related art can be captured as the information on the target object 2. The position adjustment mechanism is preferably configured to be movable with an accuracy of 0.1 μm. With such a configuration, it is possible to obtain the more detailed information on the target object 2. Incidentally, the position adjustment mechanism may be provided on the observation container 10 side, but in order to individually adjust the distance between the plurality of imaging units and the observation container 10, the position adjustment mechanism is preferably provided on the imaging unit side.

Furthermore, the imaging units 30A and 30B may further include a position adjustment mechanism that can move along the deepest portion of the observation container 10, that is, the boundary portion 13 of the bottom walls 12A and 12B. With such a configuration, for example, it is possible to image the target object 2 while following the target object. Incidentally, a configuration in which the imaging position of the imaging units 30A and 30B is changed by moving the observation container 10 side may be employed.

The analysis unit 40 has a function of acquiring the imaging result related to the target object 2 sent from the imaging units 30A and 30B and performing arithmetic processing and the like to perform displaying/recording of images of the target object 2 and measurement, analysis, and the like related to these images. In addition, a configuration in which various determination, evaluation, and the like are performed on the basis of the results of the measurement and the like in the analysis unit 40 may be employed. For example, in a case where the target object 2 is a cell, a configuration in which the analysis unit 40 determines whether or not the imaged target object 2 is a specific type of cell contained in the liquid sample or a configuration in which the analysis unit 40 identifies a differentiation level of the cell of the imaged target object 2 may be employed. In this manner, in a case where the analysis unit 40 performs determination or evaluation related to the target object 2, the analysis unit 40 holds in advance the information serving as a reference for the determination or the evaluation, so that it is possible to perform the determination and the evaluation by comparing the result of the imaging of the target object 2 with the information serving as a reference. In addition, the analysis unit 40 may have a configuration of performing the determination and the evaluation related to the target object 2 by using a statistical method, machine learning, or pattern recognition.

The analysis unit 40 is configured as a computer including hardware of a central processing unit (CPU), a random access memory (RAM) and a read only memory (ROM) which are main storage devices, a communication module that performs communication with other devices, an auxiliary storage device such as a hard disk, and the like. Then, the function as the analysis unit 40 is exhibited when these components operate.

Next, a measurement method using the microparticle measurement device 1 will be described. In the microparticle measurement device 1, the imaging units 30A and 30B detect the transmitted light of the liquid sample by irradiating the liquid sample including the target object 2 in the observation container 10 with the measurement light from the light source units 20A and 20B. The measurement method includes a step of imaging the target object 2, a step of performing measurement and analysis related to the target object 2 in the analysis unit 40 on the basis of the imaging results captured by the imaging units 30A and 30B, and a step of outputting the results of the measurement and analysis. As the measurement and analysis related to the target object 2, for example, there may be exemplified specifying the number of target objects 2 included in the liquid sample from the imaging result, estimating the volume of the target object 2, identifying the type of cell in a case where the target object 2 is a cell, identifying the differentiation level of the cell, and the like, but the present invention is not limited thereto. In addition, in a case where the target object 2 is an aggregate of cells, there may be exemplified identifying the internal structure of the aggregate, managing the culture state of the aggregate, and the like, but the present invention is not limited thereto. In addition, in a case where the target object 2 is a fertilized egg, there may be exemplified screening the fertilized egg, managing the culture state of the fertilized egg, and the like, but the present invention is not limited thereto. Incidentally, in a case where the target object 2 is a fertilized egg of a cow or a pig, the influence of scattering is strong, so that observation with an observation device in the related art is difficult. However, since the observation is performed by using light in the near-infrared range, the effect of scattering can be suppressed, so that the observation becomes easy.

Herein, in the microparticle measurement device 1 according to the embodiment, the imaging units 30A and 30B are configured to be able to acquire transmission images related to the target object 2 from different directions. Specifically, the imaging unit 30A is provided on the bottom wall 12B side to receive the transmitted light that has passed through the bottom wall 12B. In addition, the imaging unit 30B is provided on the bottom wall 12A side to receive the transmitted light that has passed through the bottom wall 12A. In this manner, the imaging units 30A and 30B are configured to image the transmitted light of the target object 2 from different directions. With such a configuration, the information on the target object 2 can be grasped in more detail. Therefore, as illustrated in FIG. 3, images from different angles related to the same target object 2 can be acquired in the imaging units 30A and 30B. Therefore, when calculating the three-dimensional shape of the target object 2 from the two images, the three-dimensional shape can be obtained with higher accuracy.

More specifically, as illustrated in FIG. 3, in a case where the imaging units 30A and 30B are arranged so that the optical axes are perpendicular to the bottom walls 12B and 12A, respectively, the imaging directions (directions of the transmitted light incident on the imaging units 30A and 30B) become perpendicular to each other. With such a configuration, it is possible to obtain information on the target object 2 in more detail from the imaging results obtained by the imaging units 30A and 30B, so that the three-dimensional shape of the target object 2 can be calculated with higher accuracy, and the analysis related to the target object 2 can also be performed with higher accuracy.

The angle formed by the imaging directions of the imaging units 30A and 30B is preferably 60° or more and 120° or less. When the angle formed by the imaging directions of the imaging units 30A and 30B is 90°, more detailed information on the target object 2 can be obtained as described above. However, when the angle is 60° or more and 120° or less, it is possible to sufficiently acquire information for measuring and analyzing the target object 2 to a certain extent. In addition, incidentally, the information for measuring and analyzing the target object 2 is information used for measurement and analysis contents. For example, in the case of estimating the volume of the target object 2, since not only two-dimensional information from one direction but also three-dimensional information on the target object 2 is required, the information on the three-dimensional structure of the target object 2 becomes information for the analysis and the evaluation. Therefore, if the angle formed by the imaging directions of the imaging units 30A and 30B exceeds 120°, there is a possibility that the three-dimensional information on the target object 2 cannot be acquired sufficiently.

Incidentally, the imaging units 30A and 30B are arranged so that the imaging directions are perpendicular to the bottom walls 12B and 12A, respectively. Therefore, the angle formed by the imaging directions of the imaging units 30A and 30B becomes the angle when viewed along a cross section including the target object 2 to be imaged in the observation container 10 and being perpendicular to the bottom walls 12A and 12B. Therefore, in order to set the angle formed by the imaging directions of the imaging units 30A and 30B to 60° or more, the angle formed by the bottom walls 12A and 12B is not particularly limited, but is 90° or within ±30° thereof.

As described above, according to the microparticle measurement device 1 and the observation container 10 according to the embodiment, it is possible to image the microparticles that are the target object 2 staying in the bottom of the observation container by the imaging units 30A and 30B from the outside the bottom walls 12A and 12B at the bottom portion formed by allowing the bottom wall 12A (first plate part) having the inner surface 121 (first inner surface) and the outer surface 122 (first outer surface) that are flat surfaces parallel to each other and the bottom wall 12B (second plate part) having the inner surface 123 (second inner surface) and the outer surface 124 (second outer surface) that are flat surfaces parallel to each other to intersect each other. Therefore, it is possible to image the shape of the microparticles from a plurality of directions with high accuracy.

In addition, in the observation container 10, the bottom walls 12A (first plate part) and 12B (second plate part) can be configured to be arranged so as to be perpendicular to each other. Thus, in a case where the bottom wall 12A and 12B are arranged so as to be perpendicular to each other, the image for grasping the three-dimensional shape of the microparticle can be imaged as appropriate.

In addition, in the microparticle measurement device 1 and the observation container 10 according to the embodiment, near-infrared light, that is, light having a wavelength band of 630 nm to 2000 nm is used. Since the near-infrared light is also appropriate for more detailed analysis of the internal structure and the like of the microparticles, the microparticle measurement device 1 and the observation container 10 can be used for more detailed analysis of the microparticles. Incidentally, as described later, in a case where the fluorescence emitted by the microparticles is observed by using the microparticle measurement device 1 and the observation container 10, light having a wavelength band of 350 nm to 2000 nm is used for the observation.

FIGS. 4(A) and 4(B) are diagrams describing the effects in a case where near-infrared light is used for measurement of the microparticles. FIG. 4(A) illustrates an image of an aggregate of cells as the microparticles in the imaging unit, which is obtained by using the near-infrared light as the measurement light. On the other hand, FIG. 4(B) illustrates an image of the same aggregate in the imaging unit, but the image is obtained by using the visible light as the measurement light. In the image of the visible light illustrated in FIG. 4(B), the light quantity of the light transmitted through the inside of the microparticles (aggregate of cells) is small, and thus, the internal structure of the microparticles cannot be grasped from the captured image. On the other hand, in the image of the near-infrared light illustrated in FIG. 4(A), due to the difference in the internal structure (cell density distribution) of the microparticle, there occurs a difference in light quantity of the transmitted light between the portion with high cell density and the portion with low cell density inside the microparticles, and thus, the information on the internal structure is obtained. In a case where the microparticle is a cell, the light quantity of the light transmitted through the microparticle is larger in the near-infrared light than in the visible light. Therefore, the measurement related to the internal structure of the microparticle can be performed in more detail by setting the configuration of using the near-infrared light for the measurement like the microparticle measurement device 1.

In addition, in the microparticle measurement device 1 according to the embodiment, the light source units 20A and 20B and the imaging units 30A and 30B are arranged so as to correspond to each other individually. With such a configuration, since the light quantity which the imaging units 30A and 30B receives can be enlarged, it is possible to capture the transmission image of the microparticle with higher accuracy. However, the number of light source units can be changed as appropriate. When at least one light source unit is provided, it is possible to perform the measurement of the microparticles.

In addition, the imaging units 30A and 30B are provided at positions where the optical axes of received light are perpendicular to the bottom walls 12A and 12B provided in front of the imaging unit. In the case of such a configuration, it is possible to prevent the imaging units 30A and 30B from receiving reflected light, refracted light, and the like at the bottom walls 12A and 12B.

In addition, the plurality of imaging units 30A and 30B are configured to capture a transmission image at the same position in the observation container 10, so that the transmission image of the microparticle can be obtained with higher accuracy, and the analysis accuracy can be improved.

Incidentally, the microparticle measurement device 1 and the observation container 10 according to the present invention are not limited to the above-described embodiment. For example, instead of the configuration in which the microparticle measurement device 1 includes the observation container 10, the light source units 20A and 20B, the imaging units 30A and 30B, and the analysis unit 40 as in the above-described embodiment, for example, the microparticle measurement device 1 may be configuration not to have a light source unit. In addition, three or more combinations of the light source unit and the imaging unit may be employed.

In addition, the shape of the observation container 10 can be changed as appropriate. When the observation container 10 has at least the bottom walls 12A and 12B that intersect each other, microparticles tend to stay in the boundary portion 13, so that it is possible to image the microparticles with high accuracy by allowing the imaging units 30A and 30B to image the corresponding region.

FIG. 5 is a diagram illustrating an observation container 50 according to a modified example. FIG. 5(A) is a cross-sectional diagram taken along the boundary portion 13 of the observation container 10 in FIG. 2. In addition, FIGS. 5(B) and 5(C) illustrate diagrams viewed from the cross sections (cross sections perpendicular to the line of intersection of the outer surface 122 and the outer surface 124 perpendicular to the extending direction of the boundary portion 13 along the broken line B and the broken line C in FIG. 5(A).

The observation container 50 is the same as the observation container 10 in that the bottom wall 12A (first plate part) has an inner surface 121 (first inner surface) and an outer surface 122 (first outer surface) and the bottom wall 12B (second plate part) has an inner surface 123 (second inner surface) and an outer surface 124 (second outer surface). However, the outer surfaces 122 and 124 are flat surfaces, but the inner surfaces 121 and 123 are curved surfaces. That is, the bottom walls 12A and 12B are different from the observation container 10 in that the bottom walls 12A and 12B are not flat plates.

In the observation container 50, the line of intersection 132 (refer to FIG. 5(A)) of the outer surface 122 (first outer surface) and the outer surface 124 (second outer surface) extends in a shape of a straight line similarly to the observation container 10. In addition, in the cross section perpendicular to the line of intersection 132 of the outer surface 122 and the outer surface 124, that is, in the cross sections illustrated in FIGS. 5(B) and 5(C), the inner surface 121 (first inner surface) and the outer surface 122 (first outer surface) of the bottom wall 12A are parallel to each other, and the inner surface 123 (second inner surface) and the outer surface 124 (second outer surface) of the bottom wall 12B are parallel to each other. That is, in the cross section perpendicular to the line of intersection 132 of the outer surface 122 and the outer surface 124, both the inner surfaces 121 and 123 have a shape of a straight line. However, each of the inner surface 121 (first inner surface) and the inner surface 123 (second inner surface) is curved along the extending direction of the line of intersection 132, and as a result, the line of intersection 131 of the inner surfaces 121 and 123 (refer to FIG. 5(A)) has a shape of a curved line. That is, the thicknesses of the bottom wall 12A and the bottom wall 12B change along the line of intersection 132 of the outer surface 122 (first outer surface) and the outer surface 124 (second outer surface). The line of intersection 131 of the inner surfaces 121 and 123 is close to the line of intersection 132 of the outer surface 122 (first outer surface) and the outer surface 124 (second outer surface) at the central portion of the bottom portion. In addition, the radius of curvature of the line of intersection 131 is 1 mm to 10 mm.

In the observation container 50 having the above-described configuration, the microparticles as the target object 2 tend to stay in the vicinity of the central portion where the line of intersection 131 of the inner surfaces 121 and 123 is closest to the line of intersection 132 of the outer surfaces 122 and 124 and the depth inside the container is the largest (refer to FIG. 5(A)). As described above, when the shape of the boundary portion 13 (particularly, the shape of the bottom portion in the container) is changed so that a portion of the boundary portion 13 is deeper than the other regions, the microparticles of the target object 2 tend to move to the deepened region. Therefore, when the vicinity of the central portion of the boundary portion 13 is imaged by the imaging units 30A and 30B, it is easy to image the microparticles. Incidentally, the region where the line of intersection 131 of the inner surfaces 121 and 123 is close to the line of intersection 132 of the outer surfaces 122 and 124 may be provided in a region different from the central portion.

In addition, in the observation container 50, the bottom wall 12A and the bottom wall 12B of which inner surfaces 121 and 123 are curved are not flat plates. However, in the cross section perpendicular to the line of intersection 132 of the outer surface 122 and the outer surface 124, the inner surface 121 (first inner surface) and the outer surface 122 (first outer surface) of the bottom wall 12A are parallel to each other, and the inner surface 123 (second inner surface) and the outer surface 124 (second outer surface) of the bottom wall 12B have a shape of straight lines parallel to each other. Therefore, it is possible to capture an image without the influence of distortion by a combination of the imaging ranges of the imaging units 30A and 30B, the radius of curvature of the bottom portion, and the like. For example, in a case where the imaging range of each of the imaging units 30A and 30B is set to 300 μm×500 μm and the radius of curvature of the line of intersection 131 of the inner surfaces 121 and 123 is set to 1.25 mm, the microparticles can be imaged without distortion. Incidentally, in a case where the radius of curvature of the line of intersection 131 is set to be in a range of 1 mm to 10 mm, even in a case where the imaging range of each of the imaging units 30A and 30B is changed from the above-mentioned imaging range of 300 μm×500 82 m, imaging of the microparticles with suppressed distortion can be performed. Incidentally, the radius of curvature may be set to 10 mm or more, and a case where the radius of curvature is increased from 10 mm to infinity corresponds to the observation container 10 illustrated in FIGS. 1 to 3.

In addition, in the embodiment, although a case where the observation container 10 has transparency has been described, the entire observation container 10 may not have transparency with respect to the measurement light, and it is sufficient that the region serving as the optical path of the light received by the imaging units 30A and 30B has transparency.

Figure 6:
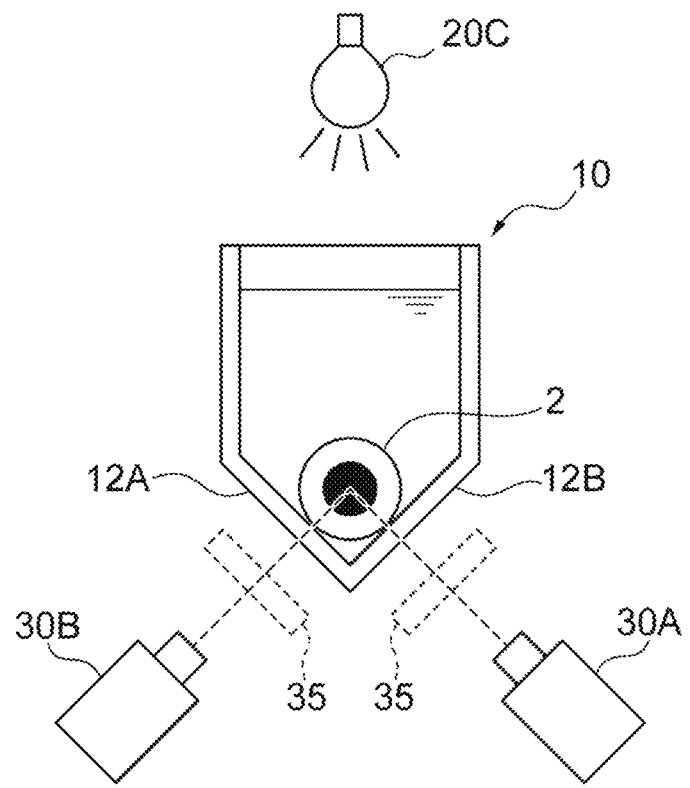
FIG. 6 is a diagram illustrating a modified example of the microparticle measurement device.

In addition, although the above embodiment has described the case of capturing the transmission image of the microparticles with respect to the measurement light irradiated from the light source units by using the observation container 10, a configuration of performing fluorescence observation by using the observation container 10 may be employed. FIG. 6 is a diagram illustrating an example of the arrangement of the light source unit and the imaging units in the microparticle measurement device 1 in the case of observing fluorescence emitted by the microparticles as the target object 2 by using the observation container 10. As illustrated in FIG. 6, in the case of observing fluorescence emitted from the target object 2 by using the observation container 10, the imaging units 30A and 30B are arranged to face the bottom walls 12A and 12B, respectively, similarly to the example illustrated in FIG. 3. On the other hand, a light source unit 20C needs not to be arranged at a position facing the imaging units 30A and 30B with the target object 2 interposed therebetween in the observation container 10 and can be arranged, for example, above the observation container 10. In addition, the numbers of the light source units 20C and the imaging units 30A and 30B may not match. Incidentally, in the case of observing the fluorescence emitted from the target object 2 by the imaging units 30A and 30B, the target object 2 is irradiated with light as excitation light (for example, light having a wavelength band of 350 nm to 800 nm can be used) from the light source unit 20C. In addition, the imaging units 30A and 30B receive light having a wavelength band different from the wavelength band of the excitation light irradiated from the light source unit 20C.

Incidentally, in the case of performing the fluorescence observation related to the microparticle as the target object 2 by using the observation container 10, it is preferable that the observation container 10 has transparency with respect to light used for observation of the target object 2, that is, both the light (excitation light) from the light source unit 20C and the fluorescence emitted by the target object 2. Incidentally, the entire observation container 10 may not have transparency with respect to the light used for measurement, and it is sufficient that the region serving as the optical path of the light received by the imaging units 30A and 30B has transparency. In addition, as illustrated in FIG. 6, a configuration in which a filter 35 is provided on each optical path of the imaging units 30A and 30B to restrict the wavelength of the light received by the imaging units 30A and 30B may be employed.

Next, an observation container 60 according to a modified example will be described with reference to FIG. 7. As illustrated in FIG. 7(A), the observation container 60 has a structure in which the inside of the container is partitioned into a plurality of accommodation portions 61. As illustrated in FIG. 7(A), the plurality of accommodation portions 61 can be configured such that the inside of the observation container 10 is partitioned by arranging a plurality of partition walls 62 along the longitudinal direction. Furthermore, a configuration where the observation container 60 is formed as an elongate columnar member and the plurality of accommodation portions 61 are arranged in the vicinity of the central portion may be employed. With such a shape, as illustrated in FIG. 7(A), a region (for example, an end portion of the observation container 60) in which the accommodation portion 61 is not formed in the observation container 60 can be supported by a support base 63.

Incidentally, each of the plurality of accommodation portions 61 of the observation container 60 is obtained by partitioning the inside of the observation container 10 by the partition walls 62 as described above. Therefore, the bottom of each accommodation portion 61 is configured with the bottom walls 12A and 12B by using two plate-shaped members. Therefore, as illustrated in FIG. 7(B), it is possible to appropriately obtain an image for three-dimensionally grasping the shape of the microparticle that is the target object 2 by using the two imaging units 30A and 30B. This is the same as the observation container 10.

In addition, in the case of a configuration in which the plurality of accommodation portions 61 are independently provided as in the observation container 60, for example, a configuration in which one target object 2 is accommodated in each of the different accommodation portions 61 may be employed. With such a configuration, a plurality of target objects 2 can be prevented from being mistakenly observed, and the movement of the target object 2 is also restricted, so that the analysis related to the target object 2 can be appropriately performed.

Incidentally, in the case of a configuration in which the plurality of accommodation portions 61 are provided as in the observation container 60, it is necessary to move the imaging units 30A and 30B or the observation container 60 when observing the target object 2. Therefore, as illustrated in FIG. 8(A), it is preferable that the observation container 60 on the support base 63 or the imaging unit 30 (imaging units 30A and 30B) is allowed to move along the extending direction (longitudinal direction) of the observation container 60 to change the target object 2 (the accommodation portion 61 in which the target object 2 is accommodated) that falls within the field of view of the imaging unit 30. Therefore, it is preferable that the microparticle measurement device 1 is provided with a moving mechanism that moves the observation container 60 or a moving mechanism that moves the imaging unit 30. Incidentally, as the moving mechanism for moving the observation container 60, the observation container 60 itself may be moved, or the support base 63 and an observation container 10C may be moved simultaneously by allowing the support base 63 to be movable.

In addition, as illustrated in FIG. 8(B), even in a case where there is one internal space like the observation container 10, it is preferable that the microparticle measurement device 1 includes a moving mechanism for moving the observation container 10 similarly to FIG. 8(A) or a moving mechanism for moving the imaging unit 30.

Figure 9:
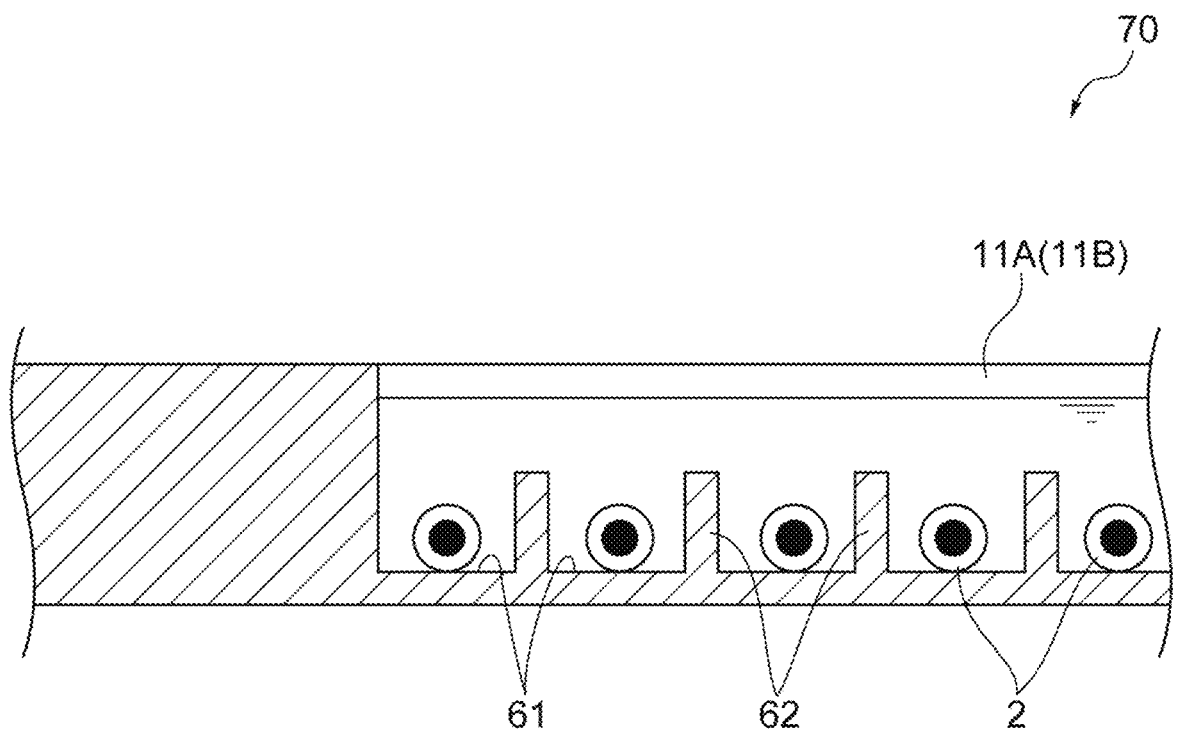
FIG. 9 is a diagram illustrating a modified example of the observation container.

FIG. 9 is a partial cross-sectional diagram describing an observation container 70 in which the configuration related to the plurality of accommodation portions 61 of the observation container 60 is modified. The observation container 70 illustrated in FIG. 9 has the plurality of accommodation portions 61 similarly to the observation container 60 illustrated in FIG. 7, but the heights of the partition walls 62 connecting the plurality of accommodation portions 61 are lower than the heights of the side walls 11A and 11B of the container. Therefore, the microparticles of the target object 2 are accommodated in the plurality of accommodation portions 61 and the movement thereof is restricted. However, in a case where the liquid sample O is filled up to a position higher than the partition walls 62, the liquid sample can be moved between the plurality of accommodation portions 61. As described above, the height of the partition wall 62 can be changed as appropriate. However, by providing the partition wall 62 and providing the plurality of accommodation portions 61, the movement of the target object 2 can be restricted.

FIG. 10 is a diagram describing an observation container 80 having a lid. The observation container 80 illustrated in FIGS. 10(A) and 10(B) is provided with an accommodation portion 61 (refer to FIG. 10(B)) as compared to the observation container 60 illustrated in FIG. 7.

In addition, a lid 65 is provided so as to cover the accommodation portion 61. The shape of the lid 65 is not particularly limited, but it is preferable that the lid 65 is provided at a position overlapping the accommodation portion 61 of the observation container 80 in plan view. With such a structure, it is possible to prevent foreign matters or the like from the outside from entering the accommodation portion 61 (that is, inside the container).

However, in a case where the microparticles to be the target object 2 are living organisms such as cells, the target object 2 and the liquid sample O may be affected if the inside of the container is sealed by the lid 65. Therefore, as illustrated in FIG. 10(B), a gap is provided between a top surface 65a (the surface on the observation container 80 side) of the lid 65 and an upper end 80a of the observation container 80, and thus, even in a case where the lid 65 is attached, a configuration in which air is permeable between the accommodation portion 61 of the observation container 80 and the outside may be employed. With such a configuration, air permeability in the accommodation portion 61 can be ensured.

Incidentally, as illustrated in FIG. 7(A), in a case where the observation container 60 is provided with the plurality of accommodation portions 61, the lid 65 may be configured to individually cover the accommodation portions 61 or may be configured to integrally cover the plurality of accommodation portions 61. In addition, the shape of the lid 65 can also be changed as appropriate.

Figure 11:
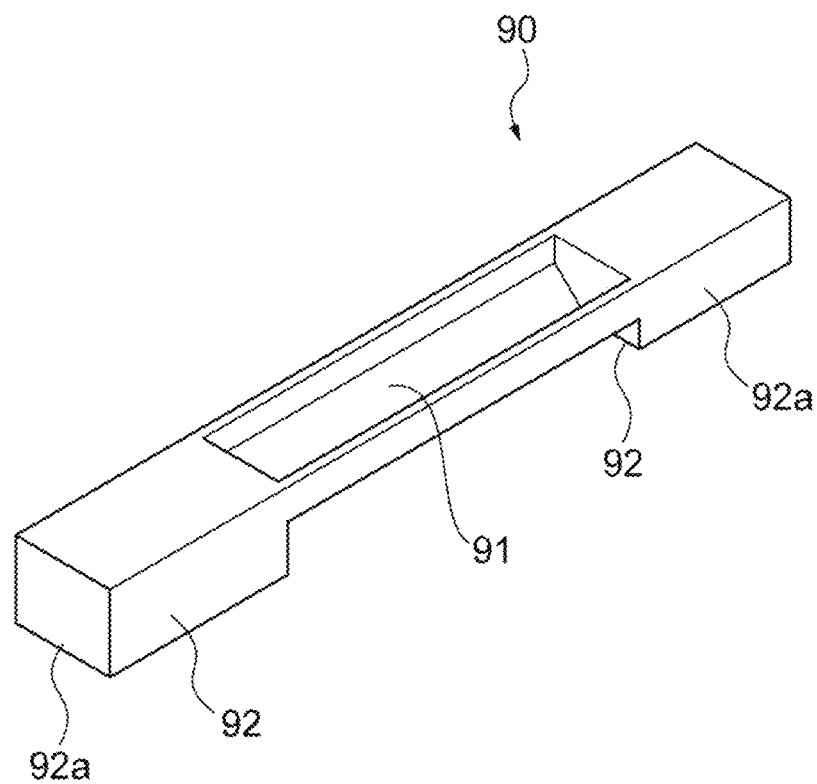
FIG. 11 is a diagram illustrating a modified example of the observation container.

FIG. 11 is a perspective diagram describing the observation container 90 in which the structure of the end portion is changed. The observation container 90 illustrated in FIG. 11 can accommodate the liquid sample O in the vicinity of the central portion similarly to the observation container 10 illustrated in FIGS. 1 and 2, but the shape of the end portion is changed. That is, the observation container 90 has an accommodation portion 91 having a function as a container at the central portion. The shape of the accommodation portion 91 is the same as that of the observation container 10 or the like. On the other hand, the observation container 90 has end portions 92 extending along the longitudinal direction, similarly to the observation container 60 and the like. Both the end portions 92 of the observation container 90 function as a support portion that supports the observation container 90. Specifically, both the end portions 92 of the observation container 90 have a quadrangular cross section, and bottom surfaces 92a are flat. In other words, in the observation container 90, the bottom surfaces 92a of both the end portions 92 are on the lower side in a state where the boundary portion of the bottom walls (the portion corresponding to the boundary portion 13 in FIG. 2) of the accommodation portion 91 functioning as a container is downward. Therefore, the observation container 90 can self-stand by using the bottom surfaces 92a of the end portions 92 in a state where the opening of the accommodation portion 91 is upward (in a state where the boundary portion of the bottom walls is downward). Therefore, for example, the observation container 90 can be mounted at a desired position without using the support base 63 illustrated in FIG. 7(A) or the like, so that handling property increases.

Incidentally, the shape of the end portion 92 different from the accommodation portion 91 can be changed as appropriate. For example, the cross section of the end portion 92 of the observation container 90 has a quadrangular shape, but at least the bottom surface 92a of the end portion 92 (support portion) may be flat in order to allow the observation container 90 to self-stand. Therefore, the shape of the end portion 92 (portion that is different from the accommodation portion 91 and does not interfere with the light source unit and the imaging unit during observation) can be changed as appropriate.

REFERENCE SIGNS LIST

1: microparticle measurement device, 10: observation container, 12A, 12B: bottom wall, 13: boundary portion, 20A, 20B: light source unit, 30A, 30B: imaging unit, 40: analysis unit.

The invention claimed is:

1. An observation container comprising
a bottom portion that includes a first plate part and a second plate part which intersect each other and that is configured to accommodate a sample containing microparticles to be imaged by an imaging device,
wherein the first plate part has a first inner surface and a first outer surface that are flat surfaces parallel to each other,
wherein the second plate part has a second inner surface and a second outer surface that are flat surfaces parallel to each other,
wherein a region having transparency with respect to a wavelength of light used for observation of the microparticles is provided in both the first plate part and the second plate part, and
wherein the observation container has a plurality of accommodation portions that are configured to accommodate the sample containing the microparticles.

2. The observation container according to claim 1, wherein the first plate part and the second plate part are arranged so as to be perpendicular to each other.

3. The observation container according to claim 1, wherein the region having transparency transmits light having a wavelength band of 350 nm to 2000 nm.

4. The observation container according to claim 1, wherein the plurality of accommodation portions are partitioned by partition walls that are lower than side walls of the accommodation portions, and the plurality of accommodation portions are connected to each other above the partition walls.

5. The observation container according to claim 1, further comprising a lid that covers an upper portion of the accommodation portion that is configured to accommodate the sample containing the microparticles and that ensures air permeability inside and outside the accommodation portion.

6. The observation container according to claim 1, further comprising a support portion that has a flat bottom surface and supports the observation container to be self-standable.

7. An observation container comprising
a bottom portion that includes a first plate part and a second plate part which intersect each other and that is configured to accommodate a sample containing microparticles to be imaged by an imaging device,
wherein the first plate part has a first inner surface and a first outer surface that is configured with a flat surface,
wherein the second plate part has a second inner surface and a second outer surface that is configured with a flat surface,
wherein a line of intersection of the first outer surface and the second outer surface extends in a shape of a straight line,
wherein, in a cross section perpendicular to the line of intersection of the first outer surface and the second outer surface, the first inner surface and the first outer surface are parallel to each other, and the second inner surface and the second outer surface are parallel to each other,
wherein a thickness of the first plate part and a thickness of the second plate part change along the line of intersection of the first outer surface and the second outer surface, respectively,
wherein the line of intersection of the first inner surface and the second inner surface is close to the line of intersection of the first outer surface and the second outer surface at the central portion of the bottom portion, and the radius of curvature of the line of intersection of the first inner surface and the second inner surface is 1 mm to 10 mm, and
wherein a region having transparency with respect to a wavelength of light used for observation of the microparticles is provided in both the first plate part and the second plate part.

8. The observation container according to claim 7, wherein the region having transparency transmits light having a wavelength band of 350 nm to 2000 nm.

9. The observation container according to claim 7, wherein the observation container has a plurality of accommodation portions that are configured to accommodate the sample containing the microparticles.

10. The observation container according to claim 9, wherein the plurality of accommodation portions are partitioned by partition walls that are lower than side walls of the accommodation portions, and the plurality of accommodation portions are connected to each other above the partition walls.

11. The observation container according to claim 7, further comprising a lid that covers an upper portion of the accommodation portion that is configured to accommodate the sample containing the microparticles and that ensures air permeability inside and outside the accommodation portion.

12. The observation container according to claim 7, further comprising a support portion that has a flat bottom surface and supports the observation container to be self-standable.

13. A microparticle measurement device comprising:
the observation container according to claim 1;
a light source unit that is configured to irradiate the sample with measurement light; and
a plurality of imaging units that are configured to capture images of the microparticles generated by the measurement light irradiated from the light source unit on an outside of each of the first plate part and the second plate part of the observation container,
wherein a region which is on the optical path of the light received by the imaging unit in the observation container has transparency with respect to a wavelength of the light used for observation of the microparticles.

14. The microparticle measurement device according to claim 13, wherein the imaging unit is provided at a position where an optical axis of the received light is perpendicular to the first plate part or the second plate part provided in front of the imaging unit.

15. The microparticle measurement device according to claim 13, wherein the light irradiated from the light source unit includes a portion of a wavelength band of 350 nm to 2000 nm.

16. The microparticle measurement device according to claim 13, wherein a plurality of the light source units are provided at positions facing the plurality of imaging units with the microparticles interposed therebetween.

17. The microparticle measurement device according to claim 13, wherein the imaging unit is configured to image fluorescence emitted by the microparticles with respect to the measurement light irradiated from the light source unit.

18. A microparticle measurement device comprising:
the observation container according to claim 7;
a light source unit that is configured to irradiate the sample with measurement light; and
a plurality of imaging units that are configured to capture images of the microparticles generated by the measurement light irradiated from the light source unit on an outside of each of the first plate part and the second plate part of the observation container,
wherein a region which is on the optical path of the light received by the imaging unit in the observation container has transparency with respect to a wavelength of the light used for observation of the microparticles.

19. The microparticle measurement device according to claim 18, wherein the imaging unit is provided at a position where an optical axis of the received light is perpendicular to the first plate part or the second plate part provided in front of the imaging unit.

20. The microparticle measurement device according to claim 18, wherein the light irradiated from the light source unit includes a portion of a wavelength band of 350 nm to 2000 nm.

21. The microparticle measurement device according to claim 18, wherein a plurality of the light source units are provided at positions facing the plurality of imaging units with the microparticles interposed therebetween.

22. The microparticle measurement device according to claim 18, wherein the imaging unit is configured to image fluorescence emitted by the microparticles with respect to the measurement light irradiated from the light source unit.

* * * * *